US012025375B2

(12) United States Patent
Graziel et al.

(10) Patent No.: US 12,025,375 B2
(45) Date of Patent: Jul. 2, 2024

(54) METHOD FOR DRYING A SUBSTRATE, DRYER MODULE FOR CARRYING OUT THE METHOD, AND DRYER SYSTEM

(71) Applicant: Excelitas Noblelight GmbH, Hanau (DE)

(72) Inventors: Bernhard Graziel, Hanau (DE); Michael Tittmann, Hanau (DE); Vincent Krafft, Hanau (DE); Larisa Von Riewel, Hanau (DE)

(73) Assignee: Excelitas Noblelight GmbH, Hanau (DE)

( * ) Notice: Subject to any disclaimer, the term of this patent is extended or adjusted under 35 U.S.C. 154(b) by 906 days.

(21) Appl. No.: 16/766,857

(22) PCT Filed: Dec. 3, 2018

(86) PCT No.: PCT/EP2018/083303
§ 371 (c)(1),
(2) Date: May 26, 2020

(87) PCT Pub. No.: WO2019/110484
PCT Pub. Date: Jun. 13, 2019

(65) Prior Publication Data
US 2020/0300542 A1 Sep. 24, 2020

(30) Foreign Application Priority Data
Dec. 6, 2017 (DE) ..................... 10 2017 129 017.6

(51) Int. Cl.
*F26B 3/28* (2006.01)
*F26B 3/04* (2006.01)
(Continued)

(52) U.S. Cl.
CPC ................ *F26B 3/283* (2013.01); *F26B 3/04* (2013.01); *F26B 3/30* (2013.01); *F26B 15/00* (2013.01);
(Continued)

(58) Field of Classification Search
CPC .... F26B 3/283; F26B 3/04; F26B 3/30; F26B 15/00; F26B 21/004; F26B 25/005; B41F 23/0413; B41F 23/0436; B41F 23/0456
See application file for complete search history.

(56) References Cited

U.S. PATENT DOCUMENTS 5,440,821 A * 8/1995 Hamrin .................. D21F 5/002 34/267
2003/0126758 A1* 7/2003 Whipple ................ F26B 3/283 34/90
(Continued)

FOREIGN PATENT DOCUMENTS

CN 1491796 A 4/2004
CN 101375121 A 2/2009
(Continued)

OTHER PUBLICATIONS

Office Action and Search Report dated Sep. 30, 2021 in CN Application No. 201880079295.2.
(Continued)

*Primary Examiner* — Edelmira Bosques
*Assistant Examiner* — Bao D Nguyen
(74) *Attorney, Agent, or Firm* — Wolf, Greenfield & Sacks, P.C.

(57) ABSTRACT

Methods for drying a substrate. The methods include the following steps: (a) emitting infrared radiation towards a substrate moving through a process space using an emitter unit comprising at least one inflated emitter, (b) generating at least two process gas streams of a process gas directed
(Continued)

towards the substrate, (c) drying the substrate by the action of infrared radiation and process gas on the substrate, and (d) extracting moisture-laden process gas from the process space via an extraction duct, forming an exhaust air stream leading away from the substrate. To specify a drying method which is reproducible and effective and leads to an improved result, in particular in terms of homogeneity and speed of drying of the substrate, the at least two process gas streams are guided to the infrared emitter before they act on the substrate, and an exhaust air stream is spatially assigned to each process gas stream.

20 Claims, 2 Drawing Sheets

(51) Int. Cl.

| | |
|---|---|
| ***F26B 3/30*** | (2006.01) |
| ***F26B 15/00*** | (2006.01) |
| ***F26B 21/00*** | (2006.01) |
| ***F26B 25/00*** | (2006.01) |
| *B41F 23/04* | (2006.01) |

(52) U.S. Cl.

CPC .......... *F26B 21/004* (2013.01); *F26B 25/005* (2013.01); *B41F 23/0413* (2013.01); *B41F 23/0436* (2013.01); *B41F 23/0456* (2013.01)

(56) References Cited

U.S. PATENT DOCUMENTS

| | | | | |
|---|---|---|---|---|
| 2004/0060193 | A1 | 4/2004 | Monkewitz et al. | |
| 2009/0031581 | A1 | 2/2009 | Lenoir | |
| 2018/0264803 | A1 * | 9/2018 | Hoshino | .................. B41J 15/08 |

FOREIGN PATENT DOCUMENTS

| | | | | |
|---|---|---|---|---|
| CN | 102632700 | A | 8/2012 | |
| DE | 102010046756 | | 3/2012 | |
| EP | 2437941 | | 4/2012 | |
| EP | 3363635 | | 8/2018 | |
| EP | 3363635 | A1 * | 8/2018 | .......... B41F 23/0413 |
| JP | 2011124431 | A | 6/2011 | |
| WO | 2013182744 | A2 | 12/2013 | |
| WO | 2014194335 | | 12/2014 | |

OTHER PUBLICATIONS

International Search Report and Written Opinion dated Jan. 28, 2019 for corresponding International Patent Application No. PCT/EP2018/083303.

* cited by examiner

METHOD FOR DRYING A SUBSTRATE, DRYER MODULE FOR CARRYING OUT THE METHOD, AND DRYER SYSTEM

CROSS REFERENCE TO RELATED APPLICATIONS

This application is a U.S. National Phase filing of International Patent Application No. PCT/EP2018/083303 filed on Dec. 3, 2018, which claims the priority of German Patent Application No. 102017129017.6 filed on Dec. 6, 2017. The disclosures of these applications are hereby incorporated by reference in their entirety.

TECHNICAL FIELD

The invention relates generally to a method for at least partially drying a substrate and, more specifically, to a method comprising the steps of:

(a) emitting infrared radiation towards a substrate that moves through a process space along a transport path and in a transport direction, by using an emitter unit comprising at least one infrared emitter, (b) generating at least two process gas streams of a process gas directed towards the substrate, and (c) at least partially drying the substrate by the action of infrared radiation and process gas on the substrate, and extracting moisture-laden process gas out of the process space via an extraction duct, forming an exhaust air stream leading away from the substrate.

Furthermore, the invention relates generally to an infrared dryer module for drying a substrate that moves through a process space in a substrate plane and in a transport direction and, more specifically, to a dryer module comprising:

(a) an emitter unit, comprising at least one infrared emitter having a longitudinal axis for emitting infrared radiation towards the substrate plane, (b) a process gas supply unit with a process gas collection space, having at least one inlet opening for the introduction of process gas from the process gas collection space into the process space, wherein a gas guiding element, which extends in the direction of the substrate plane, borders the inlet opening, and (c) an exhaust air unit with at least one extraction duct for discharging moisture-laden process gas from the process space.

In addition, the invention relates to a dryer system for drying a substrate moving through a process space in a substrate plane and in a transport direction.

Such dryer systems, dryer modules and drying methods are employed, e.g., for drying inks, paints, lacquers, adhesives or other solvent-based layers, and in particular for drying paper and paperboard and products made therefrom as well as printed matter.

BACKGROUND ART

Offset printing machines, lithographic printing machines, rotary printing machines or flexographic printing machines are commonly used for printing sheet- or web-type print substrates made of paper, paperboard, film or cardboard with printing inks. Typical ingredients of printing inks and printer inks are oils, resins, water and binders. For solvent-based, and especially for water-based, printing inks and lacquers, drying is necessary, which can be based on both physical and chemical drying processes. Physical drying processes comprise the evaporation of solvents (in particular water) and the diffusion thereof into the print substrate, which is also referred to as absorption. Chemical drying is understood to mean the oxidation or polymerization of printing ink ingredients.

There are transitions between physical and chemical drying. Thus, for example, the absorption of the solvents can cause monomeric resin molecules to move closer together, so that they may polymerize more readily. Drying apparatuses for drying the printed substrate therefore serve to remove solvent and/or to initiate crosslinking reactions.

Conventional infrared (IR) dryer systems have other functional components besides infrared emitters, such as cooling, supply air and exhaust air, which are linked together in various ways and controlled in an air management system. Thus, for example, DE 10 2010 046 756 A1 describes a dryer module and a dryer system for printing machines composed of multiple dryer modules for printing sheet or roll material.

The dryer system consists of multiple dryer modules arranged transverse to the transport direction, each of which has an elongated infrared emitter aligned with the print substrate, the longitudinal axis of which runs perpendicular to the transport direction of the print substrate. Using a controllable ventilation system, an air stream is generated, which acts on the infrared emitter and on the print substrate. The infrared emitter is arranged within a process space for the print substrate. The supply air is fed to a supply air collection space and heated therein using a heating device. In addition, the air that has been heated by the infrared emitter is carried away using a fan and added to the heated supply air, thus cooling the infrared emitter.

From the supply air collection space, the heated supply air passes into the process space via gas outlet nozzles in the form of slit nozzles. The gas outlet nozzles are arranged on both sides of the infrared emitter, wherein the front slit nozzle in the transport direction of the print substrate runs obliquely to the print substrate plane with an orientation against the transport direction, and the rear slit nozzle in the transport direction likewise runs obliquely to the print substrate plane with an orientation in the transport direction. The degree of inclination of the slit nozzles can be varied using a motor.

From the process space, the moisture-laden supply air is carried away as exhaust air via an extraction duct and part of it is fed to a heat exchanger, and another part is added to the supply air collection space.

Technical Problem

In the known dryer module, the process gas is heated using a heating device provided specifically for that purpose. The heated process gas issues towards the print substrate via the slit nozzles as a heated air stream, acting locally and otherwise in a more or less undefined manner on the print substrate to be dried until it is extracted again at another location as moisture-laden air. The effectiveness of the drying air in terms of transporting moisture away from the substrate surface is therefore not precisely reproducible. Slit nozzles are relatively complex in their construction.

The present invention is therefore based on the object of specifying a drying method that is reproducible and effective and leads to an improved result, particularly in terms of homogeneity and speed of drying of the substrate.

In addition, the invention is based on the object of providing an energy-efficient IR dryer module and a dryer system which are improved, in particular for drying solvent-containing, and more particularly water-based, printing ink, in terms of homogeneity and speed of drying.

SUMMARY OF THE INVENTION

In terms of the method, this object is achieved according to the invention, starting from a method of the type mentioned above, in that the at least two process gas streams are guided to the infrared emitter before they act on the substrate, and in that an exhaust air stream leading away from the substrate is spatially assigned to each process gas stream directed towards the substrate.

The at least two process gas streams are guided to the infrared emitter before they act on the substrate.

The process gas is, in the simplest case, air. It is used primarily to carry moisture away from the substrate. For this purpose, the process gas is heated before it acts on the substrate. In contrast to the generic method, the two process gas streams are heated by impinging on the hot infrared emitter and on any hot gas guiding elements in the immediate vicinity thereof. To this end, the process gas streams are guided to the infrared emitter, so that they at least partially flow around the emitter. At the same time, they cool the infrared emitter and any gas-guiding elements in the vicinity. By heating up the process gas, the process gas can absorb a relatively large amount of moisture.

The at least one infrared emitter is, e.g., a tubular emitter with an elongated emitter tube, or an emitter tube bent into a U-shape or ring shape, or a panel-shaped, tile-shaped emitter. It can comprise a reflector and a housing. In these infrared emitter embodiments, the heating of the process gas by flowing over the infrared emitter takes place, e.g., by the fact that the process gas flows around the emitter tube on the longitudinal sides thereof, or in that the process gas impinges on the flat sides of a panel-shaped infrared emitter and is passed on towards the process space laterally or via openings in the emitter panel.

These infrared emitters have an emission wavelength, e.g., in the range of around 1,000 to 2,750 nm and generally—in particular in confined spaces like those that are typical of printing machines, for example—have to be actively cooled to protect them from overheating. In the method according to the invention, the process gas reaching the infrared emitter is heated, at the same time cooling the infrared emitter. Thus, the cooling gas for the infrared emitter, after it has been heated, simultaneously acts as a heated process gas for the drying process. An additional heating of the process gas can be omitted, or the additional heating of the process gas can take place with less energy consumption than would be the case without the additional heating by the infrared emitter, which has to be cooled in any case. This results in an efficient use of energy.

An exhaust air stream leading away from the substrate is spatially assigned to each process gas stream that is directed towards the substrate.

The heated process gas is introduced into the process space as a directed and heated process gas stream. The process gas stream is not dispersed, but has a main propagation direction in which it advances towards the substrate surface according to the volume of the process gas and the flow rate, and impinges thereon at a predefined angle and acts on the coated substrate in a drying manner. “Acting” here means that the process gas stream dries the layer, e.g., in that solvent is taken up from the layer into the gaseous phase and gas turbulence is generated in the region of the substrate surface.

The moisture-laden process gas and other gaseous components issuing from the substrate are completely or partially removed from the process space as exhaust air. The directed stream of exhaust air is generated by extracting via an extraction duct, so that the exhaust air stream—like the process gas stream—also has a main propagation direction. The direction of the exhaust air stream is crucially determined by the position and alignment of the extraction duct relative to the substrate surface and is defined as an imaginary extension of the extraction duct towards the substrate surface.

The spatial assignment of the process gas streams and the exhaust air stream is obtained by the fact that at least one exhaust air stream is adjacent to each of the at least two process gas streams impinging on the substrate surface, or more precisely: each of the at least two process gas streams merges with an exhaust air stream on the substrate surface.

The spatial arrangement causes a mutual interaction of the gas streams on the substrate surface. The interaction of the respective gas streams is thus brought about an the one hand by the fact that the flow directions of the heated process gas and moisture-laden exhaust air are different, and on the other hand by the fact that, as a consequence of the spatial arrangement explained above, they are forced to converge. The resulting forced interaction between process gas stream and exhaust air stream leads to gas turbulence in close proximity to the substrate surface. This gas turbulence can cause a disturbance, reduction or even separation of the fluid-dynamic laminar flow boundary layer and an associated improvement in the mass transfer and in particular in the removal of moisture from the substrate.

In the method according to the invention, rapid and effective drying of the substrate is achieved as a result of these measures, together with the lowest possible energy consumption. Moreover, by controlling the volumes of process gas and exhaust air, the degree of gas turbulence can be controlled and thus the effectiveness of the drying can also be adjusted reproducibly.

To assist with the formation of gas turbulence, the main propagation directions of process gas and exhaust air form an angle of less than 90 degrees in the preferred case, and in the particularly preferred case they are directed in opposite directions.

It has proved advantageous to employ an infrared emitter having a longitudinal axis, wherein the infrared emitter has one of the two process gas streams flowing over it on each side of its longitudinal axis.

The infrared emitter is arranged—preferably centrally—in or below a slit-shaped inlet opening in a wall delimiting the process space, so that it forms a longitudinal gap or preferably two equally wide longitudinal gaps with the wall, from which the process gas issues along the two longitudinal sides of the infrared emitter towards the substrate surface. The slit-shaped inlet opening is configured, e.g., as a through-gap or as a juxtaposition of a plurality of individual openings.

The infrared emitter thus contributes to generating the two process gas streams and at the same time the process gas streams flow over it. Each of the process gas streams that are generated acts on the substrate to be dried in a strip-shaped surface region. The respectively assigned extraction streams may optionally also each be preferably configured in a strip shape.

Preferred techniques for the method according to the invention, in which the emitter unit employed for the purpose of a planar infrared irradiation of the substrate comprises a plurality of infrared emitters which have longitudinal axes running parallel to each other in each case, will be explained below.

In a particularly effective embodiment of this technique, a process gas stream directed towards the substrate is guided around each of the longitudinal sides of the infrared emitter, wherein adjacent process gas streams of adjacent infrared emitters are spatially assigned to a common exhaust air stream.

In this method variant an exhaust air stream runs between two process gas streams in each case, one of which is to be assigned to one infrared emitter and the other to the adjacent infrared emitter. Viewed in the direction of the longitudinal axis of the infrared emitter, the following flow sequence is obtained between the two adjacent infrared emitters: process gas stream, exhaust air stream, process gas stream. The process gas streams that are involved interact with the common exhaust air stream and they can preferably also interact with each other, specifically on a common strip-shaped region of the substrate surface.

By the mutual interactions of the streams, a particularly intensive gas turbulence is generated in the common strip-shaped region of the substrate surface, which particularly effectively disturbs, reduces or separates the laminar flow boundary layer on the substrate surface so that rapid drying is achieved. The common utilization of an exhaust air stream by two adjacent process gas streams permits a close spatial arrangement of the infrared emitters of the emitter array and thus effective drying, together with a compact construction.

The longitudinal axes of the infrared emitters can run perpendicular to the transport direction of the substrate, thus extending over the entire width of the substrate, for example. In some applications, however, e.g., in printing machines, it is desirable that one and the same device can be used for treating substrates of different widths. It may be that infrared radiation is only needed over the so-called "format width," which can be smaller than the total equipped width of the device which is fitted with infrared emitters. In this respect in particular, it has proved advantageous if the longitudinal axes of the infrared emitters run in the substrate transport direction or form an angle of less than 30 degrees with the substrate transport direction.

Because the infrared emitters are arranged in the direction of the substrate transport direction, marginal infrared emitters in the overall fitment can simply be switched off as required. To avoid strip-shaped inhomogeneities in the substrate transport direction in this case, which can form on the substrate during the drying action as a result of this arrangement, a slightly oblique positioning of the infrared emitter arrangement in relation to the transport direction is advantageous, wherein the angle of inclination is small and advantageously less than 30 degrees.

Another preferred technique is characterized in that the process space is formed in an infrared dryer module having a combination of the following components in the transport direction of the substrate: a front air knife, an irradiation space fitted with multiple infrared emitters arranged parallel to each other, an air exchanger unit with an integrated extraction mechanism and a rear air knife.

These components are part of a dryer module, which in turn can be part of a dryer system in which multiple identical or different dryer modules are combined. The method steps performed by the individual components will be explained below. The irradiation space is fitted with an emitter array made up of infrared emitters, where the treatment of the substrate by heating and drying, as explained above, takes place under the action of process gas, extraction mechanism and infrared radiation.

The front air knife generates an intensive air stream directed towards the substrate surface in the transport direction, which breaks through the laminar flow boundary layer on the substrate, generates turbulence and thus promotes evaporation right at the beginning of the drying process.

When the substrate is brought into the process space, undesirable substances can be introduced into the process space, both via the gaseous phase and with the substrate, such as, e.g., substances in gaseous or liquid form that adhere to the substrate surfaces.

To counteract this introduction, in a preferred modification of this technique an extraction mechanism is provided downstream of the front air knife in the transport direction.

By way of this optional extraction mechanism, part of the air and of the components that have been removed from the substrate surface by the front air knife and transferred into the gaseous phase are removed from the process space right from the start.

When the substrate issues from the process space, toxic or otherwise undesirable substances in gaseous and liquid form can leave the process space unfiltered and in an uncontrolled manner, including those substances that adhere to the surfaces of the substrate by adsorption or absorption, or that are immobilized within the flow boundary layer. It is advantageous to avoid the uncontrolled discharge of such substances from the process space as far as possible.

With this in view, the rear air knife likewise generates an intensive air stream directed towards the substrate surface, which breaks through the laminar flow boundary on the substrate at the end of the process. The process gas thus accumulating upstream of the air knife is extracted in a controlled manner by the air exchanger unit with an integrated extraction mechanism positioned upstream in the transport direction and can be disposed of in a controlled manner via the process space extraction mechanism.

The air exchanger unit generates at least one air jet directed towards the substrate surface and it has an extraction mechanism by which the air jet is removed again immediately after it has acted on the substrate surface. The air exchanger unit consists of, e.g., an arrangement of alternately arranged gas inlet nozzles and extraction ducts extending over the entire width of the substrate. It has the object of entraining the moisture forming as a result of the action of the infrared radiation and transporting it away by intensive air turbulence. The direct extraction contributes to a low discharge of contaminants from the dryer module.

The rear air knife thus completes the process step of the drying of the substrate within the respective dryer module.

The front and rear air knives thus take on the additional function of air curtains at the entrance and exit of the dryer module and thus seal the IR module pneumatically. The combined action of the irradiation space with the other components described reduces the risk of contaminants, and in particular water, entering the process space and being emitted from the dryer module. This allows a process space with a particularly low water level and improves and optimizes the drying effect.

It has also proved useful if the volume characteristics of the process gas stream increase in the substrate transport direction at least over a partial length of the infrared emitter length.

The increase in the flow volume preferably takes place continuously by continuous enlargement of an open flow cross-section of an outlet opening for the process gas into the process space running along the longitudinal axes of the infrared emitters. This enables the dynamic action of the process gas, and thus the degree of turbulence at the end of the IR emitter array, to correlate with the increasing degree of evaporation in the drying process; in other words, at the beginning of the drying process when the heating of the substrate is still low and the degree of evaporation is comparatively low, less process gas is employed for drying than towards the end of the drying process when the heating of the substrate is still high and the degree of evaporation is comparatively high. This allows a particularly efficient and economic use of the process gas.

The method according to the invention advantageously comprises a process gas quantity control, in which the gas volume Vin introduced into the dryer module is adjusted so as to be smaller than the gas volume Vout extracted out of the dryer module.

The gas volume extracted out of the process space is greater than the gas volume introduced into the process space. This ensures that, as far as possible, no toxic or otherwise undesirable substances issue from the process space. The gas volume introduced into the process space comprises the volume of process gas and optionally the volumes of gas introduced by way of the air exchanger unit and the air knife or knives.

With regard to the infrared dryer module, the above-mentioned object according to the invention is achieved in that the infrared emitter is arranged in relation to the inlet opening such that it forms an inlet channel for the process gas with the gas-guiding element on each side of its longitudinal axis, and wherein at least one process gas extraction duct is adjacent to each process gas inlet channel.

The infrared emitter is arranged in relation to the inlet opening such that it forms an inlet channel for the process gas with the gas-guiding element on each side of its longitudinal axis.

The at least one infrared emitter is, e.g., a tubular emitter with an elongated emitter tube, or an emitter tube bent into a U shape, or a panel-shaped, tile-shaped emitter. It has a longitudinal axis and it can comprise a reflector and a housing.

The inlet opening runs parallel to the longitudinal axis of the infrared emitter; it is configured, e.g., as a through-gap or as a sequence of a plurality of individual openings.

The at least one infrared emitter is arranged in relation to the process gas inlet opening such that the process gas flowing from the inlet opening into the process space flows directly over and around the infrared emitter. In this case, the interspace between the infrared emitter and the gas-guiding elements forms an inlet channel for at least two process gas streams, one on each side of its longitudinal axis. The gas outlet of the process gas inlet channel is directed towards the substrate plane perpendicularly or at an angle.

The gas-guiding elements can contribute to guiding the process gas that flows out of the inlet opening and into the process chamber towards the infrared emitter; they may extend close and up to the infrared emitter or even beyond towards the substrate plane. By establishing a small gap width, i.e., a small distance between the infrared emitter and the gas-guiding elements, a jet effect is obtained, which can contribute to an acceleration of the process gas stream towards the substrate plane.

In the dryer module according to the invention, the gas-guiding elements and the infrared emitter are thus cooled by the process gas, which is heated thereby at the same time. After it has been heated, the cooling gas for the infrared emitter acts as heated process gas. An additional heating of the process gas can be omitted, or the additional heating of the process gas can take place with less energy consumption than would be the case without the additional heating by the infrared emitter, which has to be cooled in any case. This results in efficient use of energy. In addition, the infrared emitter is part of the process gas guidance; it contributes to the formation and guidance of the process gas streams over at least a small section.

At least one process gas extraction duct is adjacent to each process gas inlet channel.

The heated process gas passes through the process gas inlet channel into the process space as a directed and heated process gas. The process gas stream is not dispersed but has a main propagation direction in which, depending on the volume of the process gas and the flow rate, it advances towards the substrate surface and impinges thereon at a predefined angle, having a drying action on the substrate there.

The moisture-laden process gas and other gaseous components issuing from the substrate are completely or partially discharged from the process space. The directed stream of the exhaust air is generated by extracting via an extraction duct, so that the exhaust air stream—as well as the process gas stream—also has a main propagation direction. The direction of the stream is crucially determined by the position and alignment of the extraction duct in relation to the substrate plane.

Because there is an extraction duct adjacent to each inlet channel, this also means that there is at least one exhaust air stream adjacent to each of the at least two process gas streams impinging on the substrate surface, or better still, that each of the at least two process gas streams merges with an exhaust air stream on the substrate surface. As a result, a mutual interaction of the respective gas streams is generated on the substrate surface. The interaction of the respective gas streams is thus caused by the facts that, on the one hand, the flow directions of heated process gas and moisture-laden exhaust air are different, and, on the other hand, they converge because of the spatial arrangement as explained above. The resulting forced interaction between the process gas stream and the exhaust air stream leads to gas turbulence in close proximity to the substrate surface. This gas turbulence can cause a disturbance, reduction or even separation of the fluid dynamic laminar flow boundary layer and an associated improvement of the mass transfer and, in particular, of the removal of moisture from the substrate.

In the dryer module according to the invention, rapid and effective drying of the substrate is achieved as a result of these measures, at the same time as low energy consumption. In addition, by controlling the volumes of process gas and exhaust air, the degree of gas turbulence, and thus also the degree of drying, can be adjusted reproducibly.

To assist with the formation of gas turbulence, the main propagation directions of the process gas and the exhaust air form an angle of less than 90 degrees in the preferred case, and in the particularly preferred case they are directed in opposite directions. It has proved favorable if the gas-guiding element and the extraction duct have a common wall section, which ends at a distance from the substrate plane.

On one side of the common wall section, the heated process gas flows towards the substrate plane and, on the other side of the common wall section, the moisture-laden process gas flows away from the substrate plane as exhaust air. A high flow rate of the process gas stream and the smallest possible free distance between the end of the common wall section and the substrate plane contribute to the fact that the smallest possible amount of process gas passes directly into the extraction duct at the end of the common wall section. The free distance from the substrate plane can be less than 10 mm, for example.

A preferred embodiment of the dryer module according to the invention, in which the emitter unit employed for the purpose of a planar infrared irradiation of the substrate comprises a plurality of infrared emitters, which have longitudinal axes running parallel to each other in each case, will be explained in more detail below.

In a particularly effective embodiment of this dryer module, a common extraction duct is arranged between adjacent infrared emitters in each case.

Infrared emitters and extraction ducts alternate. This configuration results in particularly intensive gas turbulence and, nevertheless, a defined and reproducible action of the process gas stream on the substrate to be dried. Infrared emitters with adjacent infrared emitters on both sides have an extraction duct on each of their longitudinal sides, each of which is assigned to one of the two process gas streams. The exhaust air stream in the extraction duct thus runs between two process gas streams in each case, one of which is to be assigned to one infrared emitter and the other to the adjacent infrared emitter. The process gas streams involved interact with the common exhaust air stream and they can preferably also interact with each other. As a result of the mutual interactions of the streams, a particularly intensive gas turbulence is generated in a common strip-shaped region of the substrate surface, which particularly effectively disturbs, reduces or separates the laminar flow boundary layer at the substrate surface so that rapid drying of the substrate is achieved. The common use of an extraction duct by two adjacent process gas streams furthermore allows a compact construction of the infrared emitter.

Marginal infrared emitters have an extraction duct in common only with the adjacent infrared emitter, with a separate extraction duct of their own being arranged on their other longitudinal side or with another extraction mechanism acting there.

The longitudinal axes of the infrared emitters can run perpendicular to the substrate transport direction, extending over the entire substrate width, for example. In some applications, however, e.g., in printing machines, it is desirable that one and the same device can be used for treating substrates of different widths. It may be that infrared radiation is only needed over the so-called "format width," which can be smaller than the total equipped width of the device which is fitted with infrared emitters. In this respect in particular, it has proved advantageous if the longitudinal axes of the infrared emitters run in the substrate transport direction or form an angle of less than 30 degrees with the substrate transport direction.

Because the infrared emitters are arranged in the direction of the substrate transport direction, marginal infrared emitters in the overall fitment can simply be switched off as required. To avoid strip-shaped inhomogeneities in the substrate transport direction in this case, which can form on the substrate during the drying action as a result of this arrangement, a slightly oblique positioning of the infrared emitter arrangement in relation to the transport direction is advantageous, wherein the angle of inclination α is small and advantageously less than 30 degrees.

Another preferred embodiment of the dryer module is characterized in that the process space is formed in an infrared dryer module having the following components viewed in the transport direction; a front air knife, an irradiation space fitted with multiple infrared emitters arranged parallel to each other, an air exchanger unit with an integrated extraction mechanism and a rear air knife.

These components are part of a dryer module, which in turn can be part of a dryer system in which multiple identical or different dryer modules are combined. The method steps performed by the individual components will be explained below. The irradiation space is fitted with an emitter array made up of infrared emitters, where the treatment of the substrate by heating and drying, as explained above, takes place under the action of process gas, an extraction mechanism and infrared radiation.

The front air knife generates an intensive air stream directed towards the substrate surface in the transport direction, which breaks through the laminar flow boundary layer on the substrate, generates turbulence and thus promotes evaporation right at the beginning of the drying process.

When the substrate is brought into the process space, undesirable substances can be introduced into the process space both via the gaseous phase and with the substrate, such as, e.g., substances in gaseous or liquid form that adhere to the substrate surfaces.

To counteract this introduction, in a preferred modification it is provided that the front air knife is followed in the transport direction by an extraction mechanism.

By way of this optional extraction mechanism, part of the air and of the components that have been removed from the substrate surface by the front air knife and transferred into the gaseous phase are removed from the process space right from the start.

When the substrate issues from the process space, toxic or otherwise undesirable substances in gaseous and liquid form can leave the process space unfiltered and in an uncontrolled manner, including those substances that adhere to the surfaces of the substrate by adsorption or absorption, or that are immobilized within the flow boundary layer. It is advantageous to avoid the uncontrolled discharge of such substances from the process space as far as possible.

With this in view, the rear air knife likewise generates an intensive air stream directed towards the substrate surface, which breaks through the laminar flow boundary layer on the substrate at the end of the process. The process gas thus accumulating upstream of the air knife is extracted in a controlled manner by the air exchanger unit with an integrated extraction mechanism positioned upstream in the transport direction and can be disposed of in a controlled manner via the process space extraction mechanism.

The air exchanger unit generates at least one air jet directed towards the substrate surface and it has an extraction mechanism, by which the air jet is removed again immediately after it has acted on the substrate surface. The air exchanger unit consists of, e.g., an arrangement of alternately arranged gas inlet nozzles and extraction ducts extending over the entire width of the substrate. It has the object of entraining the moisture forming as a result of the action of the infrared radiation and transporting it away by intensive air turbulence.

The rear air knife thus completes the process step of the drying of the substrate within the respective dryer module.

The front and rear air knives thus take on the additional function of air curtains at the entrance and exit of the dryer module and thus seal the IR module pneumatically. The combined action of the irradiation space with the other components described reduces the risk of contaminants, and in particular water, entering the process space and being emitted from the dyer module. This allows a process space with a particularly low water level and improves and optimizes the drying effect.

With regard to the dryer system for drying a substrate moving through a process space in a substrate plane and in a transport direction, the aforementioned technical object according to the invention is achieved by the fact that it contains multiple dryer modules according to the invention, which are arranged next to one another and/or one behind another in the transport direction.

It is to be understood that both the foregoing general description and the following detailed description are exemplary, but are not restrictive, of the disclosure.

BRIEF DESCRIPTION OF THE DRAWINGS

The invention will be explained in more detail below with reference to exemplary embodiments and patent drawings. In detail, the drawings show schematic illustrations and include the following figures.

DETAILED DESCRIPTION

In infrared emitters, a heating filament composed of carbon or tungsten in coil or strip form is enclosed in an inert-gas-filled emitter tube, which is usually made of quartz glass. The heating filaments are joined to electrical connections, which are introduced via one end or both ends of the emitter tube.

Figure 1:
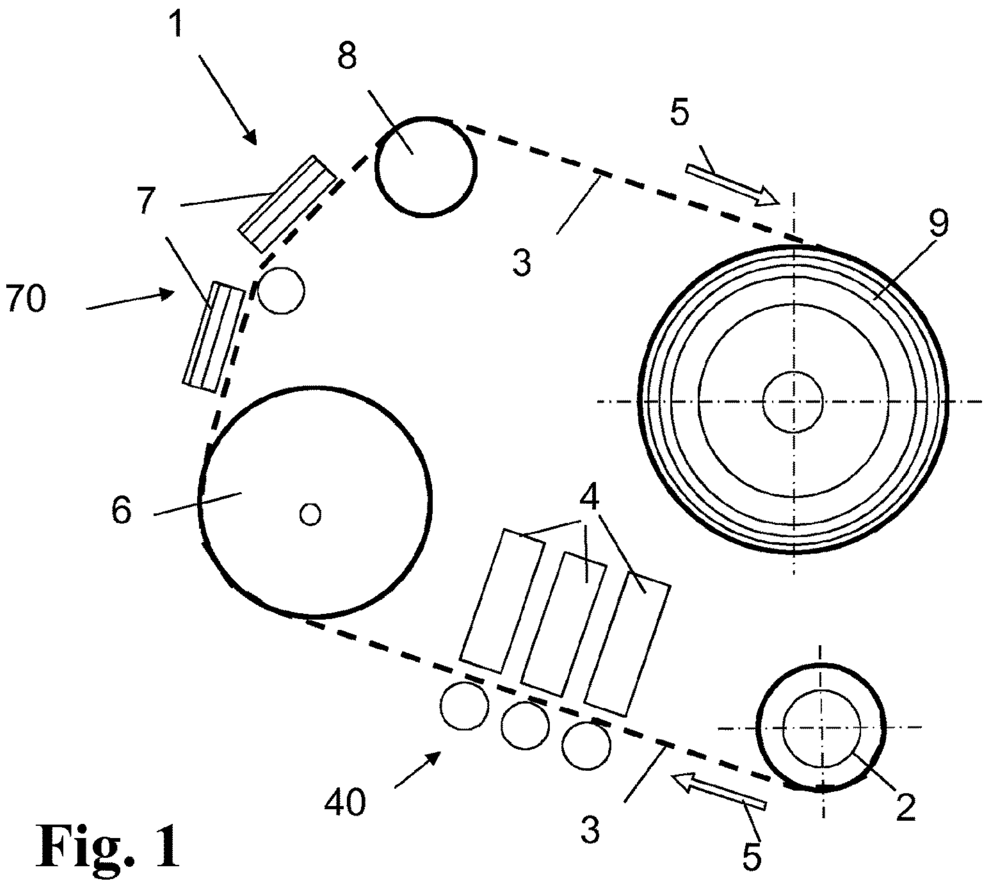
FIG. 1 shows a printing machine with a printing unit and an infrared dryer system and a print substrate which is transported along a transport path and in a transport direction.

FIG. 1 shows a diagram of a printing machine in the form of a roll-fed inkjet printing machine, which is assigned the overall reference number 1. Starting from an unwinder 2, the material web 3 composed of a print substrate, such as, e.g., paper, passes to a printing unit 40. This printing unit 40 comprises multiple inkjet printing heads 4 arranged one behind the other along the material web 3, by which solvent-based, and in particular water-based, printing inks are applied on to the print substrate.

Viewed in the transport direction 5, the material web 3 then passes from the printing unit 40 via a deflecting roller 6 to an infrared dryer system 70. This infrared dryer system 70 is fitted with multiple dryer modules 7, which are designed for drying the solvent or for its absorption into the material web 3.

The further transport path of the material web 3 passes via a traction roller 8, which is equipped with its own traction drive motor and via which the web tension is adjusted, to a take-up roller 9.

In the dryer system 70, multiple dryer modules 7—four in the exemplary embodiment—are grouped together. Each of the dryer modules 7 is equipped with multiple infrared emitters—eighteen in the exemplary embodiment.

The dryer modules 7 are arranged in pairs in the dryer system 70, one beside the other and one behind the other viewed in the transport direction 5. The pairs of dryer modules 7 arranged one beside the other each cover the maximum format width of the printing machine 1. Corresponding to the dimensions and ink coverage of the print substrate, the dryer modules 7 and the individual infrared emitters can be electrically controlled separately from each other.

The transport speed of the material web 3 is set at 5 m/s. This is a comparatively high speed, which is made possible by an optimization of the individual processing steps and which requires in particular a high drying rate. The drying method needed in order to meet this requirement and the dryer module 7 employed for this purpose will be explained in more detail below with reference to FIGS. 2 to 4. Where the same reference numbers are used in these figures as in FIG. 1, they refer to identically constructed or equivalent components and parts, as explained in more detail above with reference to the description of the printing machine.

Figure 2:
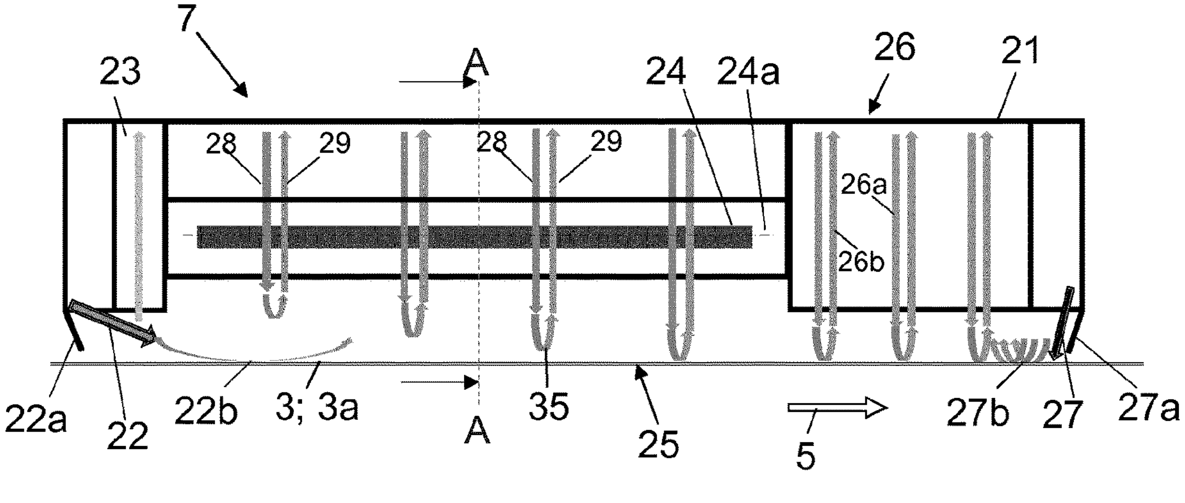
FIG. 2 shows a dryer module according to the invention as part of the dryer system of the printing machine of FIG. 1 in a longitudinal section in the print substrate transport direction.

In the embodiment of the dryer module 7 according to the invention shown in FIG. 2, a housing 21 encloses a treatment space (or process space) for the material web 3 having the following components (viewed in the transport direction 5): a front air knife 22 with an air baffle 22*a*, an extraction mechanism 23 immediately downstream of the front air knife 22, an infrared irradiation chamber 25 fitted with the eighteen infrared emitters 24, of which the longitudinal axes 24*a* run approximately in the transport direction 5 and which are arranged parallel to each other, an air exchanger unit 26 having alternately arranged gas inlet nozzles 26*b* and extraction ducts 26*a* and a rear air knife 27 having a final air baffle 27*a*.

The directional arrows 28 indicate an air stream directed on to the surface of the material web 3, and the directional arrows 29 indicate an air stream leading away from the material web 3, as well as a mutual interaction 35 of these air streams, which will be explained with reference to FIG. 3. The increasing length of the directional arrows 28; 29 in the transport direction 5 symbolizes the increase in the respective flow volumes. The surface of the material web 3 corresponds at the same time to the substrate plane 3*a*.

Figure 3:
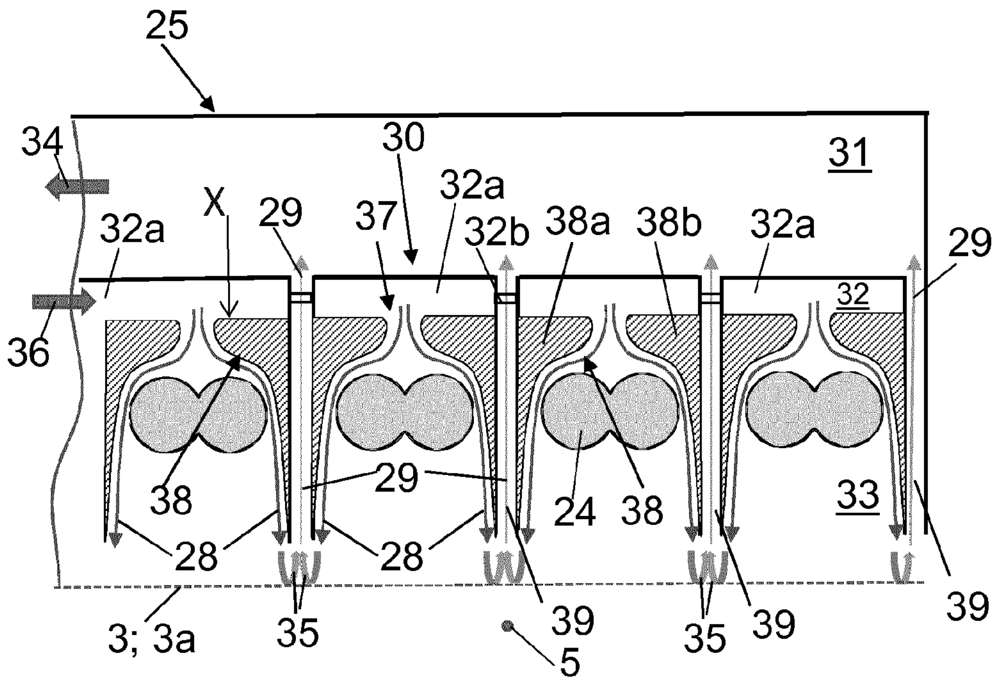
FIG. 3 shows a detail of the irradiation unit of the dryer module according to the invention in a section along the line A-A of FIG. 2.

The cross-section shown in FIG. 3 comprises a section of the infrared irradiation chamber 25 along four identically constructed infrared emitter units 30. The cross-section shows an extraction space 31, a gas-feeding space 32 and the actual infrared substrate-treatment space 33.

The gas-feeding space 32 is connected to a gas inlet 36 and is composed of multiple gas-collecting spaces 32*a*, which are in fluid connection with each other by way of lines 32*b*. Each emitter unit 30 has a gas-collecting space 32*a*. Each gas-collecting space 32*a* is provided with a central, elongated opening 37 to the substrate-treatment space 33. The elongated opening 37 has the shape of a longitudinal slit extending in the substrate transport direction 5 (perpendicular to the paper plane), which is delimited on both longitudinal sides by gas-guiding elements 38*a*; 38*b*. In the cross-section shown in FIG. 3, the gas-guiding elements 38*a*; 38*b* arch over the infrared emitter 24 in a bell-like manner and are also referred to collectively below as an "air-conducting bell 38." The air-conducting bell 38 ends at a distance of around 10 mm in front of the surface of the material web 3 (the substrate plane 3*a*).

The extraction space 31 has a gas outlet 34, which is connected to a fan (not shown in the figure). Slot-shaped extraction ducts 39, which run between adjacent IR emitter units 30 and each of which ends in front of the substrate plane 3*a* with the gas-guiding elements 38*a* and/or 38*b*, lead into the extraction space 31.

The infrared emitters 24 arranged in the substrate-treatment space 33 are in the form of commercial twin tube emitters. They consist of a quartz glass bulb having a cross-section in a figure-of-eight shape, enclosing two sub-areas separated from each other by a central web. Their nominal output is 3,500 W. The total emitter length is 70 cm and the external dimensions of the bulb are 34×14 mm.

Figure 4:
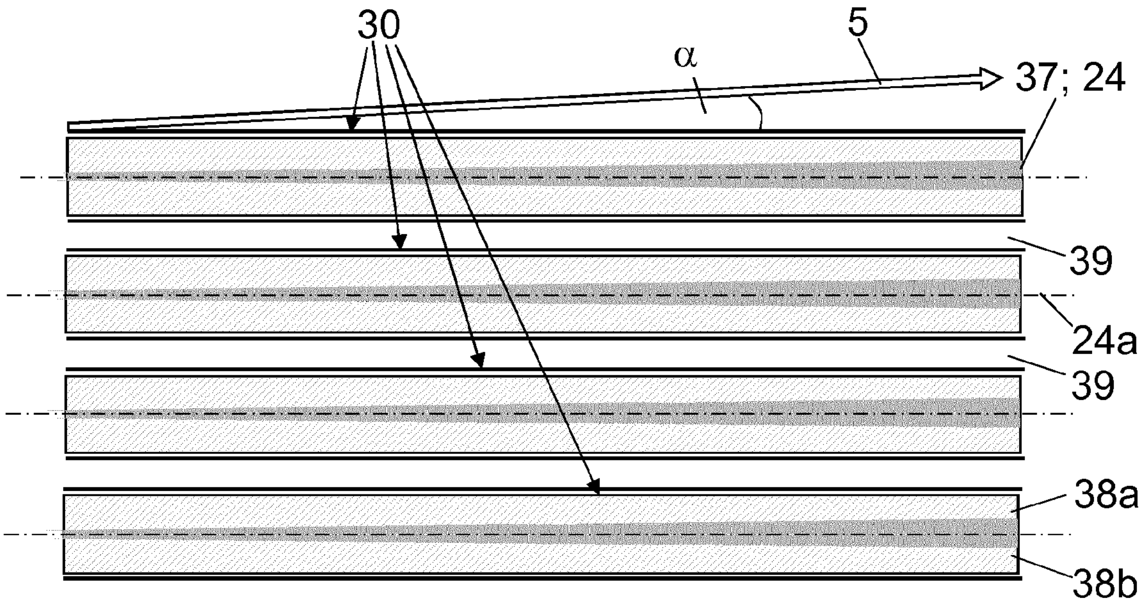
FIG. 4 shows a detail of the irradiation unit in a plan view of emitter units in the direction of the arrow X of FIG. 3.

FIG. 4 shows a detail of the irradiation unit in a plan view of emitter units 30 in the direction of the arrow X of FIG. 3. From the plan view of the emitter units 30 in FIG. 4, the opening 37 into the substrate-treatment space 33 for the cooling air can be seen and, behind it, the infrared emitters 24. The opening width of the elongated opening 37 broadens continuously in the transport direction 5. The width of the extraction ducts 39, on the other hand, remains constant in the transport direction 5. The transport direction 5 forms an angle α of 10 degrees with the longitudinal sides of the extraction ducts 39, and with the longitudinal axes 24*a* of the infrared emitters 24 (not visible in the figure), respectively.

The method according to the invention will be explained in more detail below by way of example, with reference to FIGS. 1 to 4:

The components of the dryer module 7 of FIG. 2 have the following functions and effects.

The front air knife 22, with the aid of the air baffle 22*a*, generates an intensive air stream 22*b* directed toward the substrate plane 3*a* (and onto the surface of the print substrate of the material web 3) in the transport direction 5, which breaks through the laminar flow boundary layer on the material web 3, generates turbulence and thus promotes evaporation right at the beginning of the drying process. By way of the extraction mechanism arranged downstream of the front air knife 22 in the transport direction 5, part of the air and of the components that have been swirled up by the front air knife 22 are extracted out of the dryer module 7.

So that, as far as possible, no toxic or otherwise undesirable substances in gaseous and liquid form leave the process space unfiltered and in an uncontrolled manner when the material web 3 issues from the dryer module 7, the rear air knife 27, with the aid of the air baffle 27*a*, likewise generates an intensive air stream directed onto the surface of the print substrate of the material web 3, which breaks through the laminar flow boundary layer on the material web 3. The process gas 27*b* thereby accumulating upstream of the rear air knife 27 is removed by the air exchanger unit 26 which is arranged upstream in the transport direction 5. For this purpose, multiple air curtains running transverse to the transport direction 5 are generated by the air exchanger unit 26. Using alternating gas inlet nozzles 26*b* and extraction ducts 26*a*, a supply air stream directed onto the surface of the print substrate of the material web 3 is generated at each air curtain, and this is drawn off again by an exhaust air stream immediately after impinging on the surface of the print substrate. The air exchanger unit 26 can entrain the moisture obtained as a result of the action of the infrared radiation using intensive air turbulence and can remove it by way of its integrated extraction mechanism, so that undesirable components cannot leave the dryer module 7 in an uncontrolled manner.

The treatment of the print substrate of the material web 3 in the infrared irradiation chamber 25 comprises heating using infrared radiation while at the same time exposing to dry air. In order that both treatments act as effectively as possible on the print substrate of the material web 3, the cooling air flowing into the substrate-treatment space 33 from the gas-feeding space 32 through the elongated opening 37 is divided into two process gas streams flowing along the directional arrows 28, which are guided to the infrared emitter 24 and partially around the bulb thereof. The infrared emitter 24 is cooled during this process and, at the same time, the cooling air is heated.

Between the wall of the infrared emitter 24 and the air-conducting bell 38, a narrow gap is obtained, which accelerates the two air streams flowing along the directional arrows 28 towards the print substrate of the material web 3, so that they act intensively thereon and transfer moisture into the gaseous phase or absorb it. As a result of being heated, the cooling air has an increased absorption capacity for moisture.

An exhaust air stream flowing along the directional arrows 29 leading away from the print substrate of the material web 3 is spatially assigned to each air stream flowing along the directional arrows 28 directed onto the print substrate of the material web 3, in that the directions of the inflowing air stream flowing along the directional arrows 28 and the aspirated air stream flowing along the directional arrows 29 are directed in practically opposite directions (in the exemplary embodiment they form an angle of less than 30 degrees with each other) and converge in an interaction region 35, the interaction region 35 lying on the surface of the print substrate of the material web 3. Each of the two air streams flowing along the directional arrows 28 therefore merges with an exhaust air stream flowing along the directional arrows 29 on the surface of the print substrate of the material web 3. The resulting forced interaction between the air stream flowing along the directional arrows 28 and the exhaust air stream flowing along the directional arrows 29 leads to gas turbulence in the interaction region 35, i.e., in close proximity to the surface of the print substrate of the material web 3, which can cause a disturbance, reduction or even separation of the fluid dynamic laminar flow boundary layer and an associated improvement in mass transfer and in particular the removal of moisture from the print substrate of the material web 3.

An exhaust air stream flowing along the directional arrow 29 runs between two air streams flowing along the directional arrows 28 in each case, one of which is to be assigned to one infrared emitter 24 and the other to the adjacent infrared emitter 24. As shown in FIG. 3, the following flow sequence is obtained between adjacent infrared emitters 24: air stream flowing along the directional arrow 28—exhaust air stream flowing along the directional arrow 29—air stream flowing along the directional arrow 28. These air streams flowing along the directional arrows 28 interact with the common exhaust air stream flowing along the directional arrow 29 and they can preferably also interact with each other, specifically on the common strip-shaped interaction region 35 on the surface of the print substrate of the material web 3. The mutual interactions of the air streams flowing along the directional arrows 28, 29, 28 generate a particularly intensive gas turbulence in the common strip-shaped interaction region 35 of the substrate surface, which disturbs, reduces or separates the laminar flow boundary layer at the print substrate surface particularly effectively so that rapid drying is achieved. The common utilization of an exhaust air stream flowing along the directional arrow 29 by two adjacent air streams flowing along the directional arrows 28 allows a close spatial arrangement of the infrared emitters 24 of the emitter array and thus effective drying at the same time as a compact construction.

Although illustrated and described above with reference to certain specific embodiments and examples, the present disclosure is nevertheless not intended to be limited to the details shown. Rather, various modifications may be made in the details within the scope and range of equivalents of the claims and without departing from the spirit of the disclosure.

The invention claimed is:

1. An infrared dryer module for drying a substrate that moves through a process space in a substrate plane and in a transport direction, the dryer module comprising:

(a) an emitter unit comprising a plurality of infrared emitters emitting infrared radiation towards the substrate plane, and each having a longitudinal axis, the longitudinal axes of which are parallel to each other;

(b) a process gas supply unit with a process gas collection space having at least one inlet opening for an introduction of process gas from the process gas collection space into the process space, each inlet opening having a gas-guiding element which extends in a direction of the substrate plane and borders the respective inlet opening;

(c) an exhaust air unit with at least one extraction duct for discharging moisture-laden process gas from the process space, wherein each of the infrared emitters is arranged in relation to the at least one inlet opening such that, together with the gas-guiding element, it forms an inlet channel for the process gas on each side of its longitudinal axis, and wherein the at least one extraction duct is adjacent to each process gas inlet channel, wherein the at least one extraction duct includes a common extraction duct arranged between adjacent infrared emitters, and wherein each of the plurality of infrared emitters has a length, and a volume characteristic is imposed on a process gas stream which increases in the transport direction at least partially over the length of the infrared emitter.

2. The dryer module according to claim 1, wherein the gas-guiding element and the at least one extraction duct have a common wall section, which ends at a distance from the substrate plane.

3. The dryer module according to claim 1, wherein the longitudinal axes of the infrared emitters form an angle of less than 30 degrees with the transport direction.

4. The dryer module according to claim 1, further comprising, located in the process space, and viewed in the transport direction, a front air knife, an irradiation space fitted with the plurality of infrared emitters arranged parallel to each other, an air exchanger unit with an integrated extraction mechanism and a rear air knife.

5. The dryer module according to claim 4, wherein the front air knife is followed in the transport direction by an additional extraction mechanism.

6. A dryer system for drying a substrate moving through a process space in a substrate plane and in a transport direction, containing multiple dryer modules according to claim 1 which are arranged next to one another and/or one behind another in the transport direction.

7. An infrared dryer module for drying a substrate that moves through a process space in a substrate plane and in a transport direction, the dryer module comprising:

(a) an emitter unit comprising a plurality of infrared emitters emitting infrared radiation towards the substrate plane, each having a longitudinal axis, the longitudinal axes of which are parallel to each other;

(b) a process gas supply unit with a process gas collection space having at least one inlet opening for an introduction of process gas from the process gas collection space into the process space, each inlet opening having a gas guiding element which extends in a direction of the substrate plane and borders the respective inlet opening;

(c) an exhaust air unit with at least one extraction duct for discharging moisture-laden process gas from the process space, wherein each of the infrared emitters is arranged in relation to the at least one inlet opening such that, together with the gas guiding element, it forms an inlet channel for the process gas on each side of its longitudinal axis, and wherein the at least one extraction duct is adjacent to each process gas inlet channel, and wherein each of the plurality of infrared emitters has a length, and a volume characteristic is imposed on a process gas stream which increases in the transport direction at least partially over the length of the infrared emitter.

8. The dryer module according to claim 7, wherein the gas guiding element and the at least one extraction duct have a common wall section, which ends at a distance from the substrate plane.

9. The dryer module according to claim 7, wherein the longitudinal axes of the infrared emitters form an angle of less than 30 degrees with the transport direction.

10. The dryer module according to claim 7, further comprising, located in the process space, and viewed in the transport direction, a front air knife, an irradiation space fitted with the plurality of infrared emitters arranged parallel to each other, an air exchanger unit with an integrated extraction mechanism, and a rear air knife.

11. The dryer module according to claim 10, wherein the front air knife is followed in the transport direction by an additional extraction mechanism.

12. The dryer module according to claim 7, wherein the gas guiding element arches over each of the plurality of infrared emitters in a bell shape and extends in the direction of the substrate plane until it reaches a distance of 10 mm from the substrate.

13. The dryer module according to claim 7, wherein each of the plurality of infrared emitters comprises a quartz glass bulb having a cross-section in a figure-of-eight shape.

14. The dryer module according to claim 13, wherein the quartz glass bulb for each of the plurality of infrared emitters has external dimensions of 34 mm by 14 mm.

15. The dryer module according to claim 7, wherein each of the plurality of infrared emitters has an output of 3500 W.

16. The dryer module according to claim 7, wherein each of the plurality of infrared emitters has a length of 70 cm.

17. The dryer module according to claim 7, further comprising an elongated opening that connects the process gas collection space and the process space, wherein the elongated opening has a shape of a longitudinal slit extending in the transport direction.

18. The dryer module according to claim 17, wherein the elongated opening has a width which broadens continuously in the transport direction.

19. The dryer module according to claim 18, wherein a width of the at least one extraction duct remains constant.

20. The dryer module according to claim 7, wherein the at least one extraction duct forms an angle of 10 degrees with the transport direction.

* * * * *